Patented June 24, 1941

2,247,262

UNITED STATES PATENT OFFICE 2,247,262

COMPOSITION AND METHOD FOR TREATING MOLTEN METALS

Marvin J. Udy, Niagara Falls, N. Y.

No Drawing. Application May 28, 1940,
Serial No. 337,678

17 Claims. (Cl. 75—24)

This invention relates to metallurgy and has for an object the provision of improved metallurgical products and processes or methods. More particularly, the invention contemplates the provision of improved products and methods or processes suitable for use in the purification of molten metals and for the protection of molten metals against oxidation in casting and tapping and similar pouring operations.

According to some heretofore customary practices, various impurities are removed from molten metals by contacting the molten metals with molten slags capable of extracting or removing the impurities by solution or oxidation or otherwise. Thus, for example, impurities such as phosphorus, sulphur, oxygen and silicon are removed from steel and other ferrous metal products by contacting the steel and other ferrous metal products while molten with molten slags having the properties required for extracting or removing the particular impurity or impurities sought to be removed. Such slags are characterized as basic, acidic or neutral, depending upon their compositions. Purifying slags may be produced by placing solid slag-forming materials on the surfaces of molten metals in the furnaces in which the molten metal baths are prepared, or they may be produced by melting solid slag-forming materials in separate furnaces.

The production and use of purifying slags in accordance with heretofore customary procedures involve considerable difficulty and expense. If a slag is produced in the furnace in which the molten metal to be purified is prepared by placing solid slag-forming material on the surface of a bath of the molten metal, the slag-forming material may chill the molten metal, making further treatment of the metal difficult and resulting in the production of a pasty, viscous slag which functions inefficiently as a purifying slag. Operations involving the production of suitably fluid purifying slags in separate furnaces necessarily require substantial capital expenditures to provide the separate furnaces and necessary auxiliary equipment. Such operations involve the difficulty of handling molten slag rather than solid slag-forming material for effecting contact of molten metal and molten slag. In the purification operations employed heretofore, the molten slag may be permitted to remain relatively quietly in contact with the molten metal, or the metal and slag may be subjected to varying degrees of agitation to effect mixing and thus accelerate the purifying reactions. In operations in which the slag and metal are permitted to remain in relatively quiet contact, purification of the metal is relatively slow and inefficient. In order to accelerate and improve the efficiency of purification, it has been proposed to subject the molten metal and molten slag to such violent intermixing as to cause dispersion of the slag in a fine state of division throughout the metal. Such violent intermixing of slag and metal may be objectionable because of expense and difficulties involved in its accomplishment and because of undesirable oxidation of metal resulting from the exposure of relatively large surface areas of molten metal to the oxygen of the atmosphere.

The present invention permits elimination of many of the difficulties involved in the purification of molten metals in accordance with heretofore customary practices by providing improved products and methods or processes for producing and employing molten slags.

The improved products of the invention include solid reaction mixtures capable of reacting exothermically upon ignition to produce fluid molten slags having the properties required for their intended uses.

The improved metal purification methods of the invention involve the relatively gentle pouring of molten metal from a furnace or other container through a layer of fluid molten slag. Preferably, pouring of the molten metal is so conducted that a gently boiling mass of metal is produced beneath the slag layer, during the pouring operation, without causing substantial rupturing of the slag layer. The boiling effect causes effective and repeatedly renewed contact of substantially all portions of the molten metal with the under surface of the slag layer, while avoidance of substantial rupturing of the slag layer effectively prevents exposure of the molten metal to oxidation by the oxygen of the atmosphere.

The molten metal may be poured through the molten slag layer contained in any suitable receptacle as, for example, in a ladle or in a mold in which the metal is to be solidified in a desirable physical form or shape. Pouring of the metal through a molten slag layer in a mold may be carried out with considerable advantage. Such a procedure prevents oxidation of the metal in the mold while casting and, simultaneously, effects purification if the metal contains removable impurities. Preferably, the pouring of molten metal through molten slag in a mold is so conducted that the mold is only partially filled with metal and the slag layer is permitted to remain in place after casting to protect the upper surface of the metal against oxidation and to effect controlled cooling and solidification of the metal casting. Casting of metal through a molten slag layer in a mold results in the formation of thin films of slag on the mold and casting surfaces. The formation of such films of slag protects metal molds and protects the surfaces of the castings against pitting. Removal of the castings from the molds also is facilitated. The slag films may be removed readily from the surfaces of the molds and castings after solidification of the castings and removal of the solid castings from the molds.

The casting of metals through molten slag layers in molds is facilitated by the use of the exothermic reaction mixtures of the invention. The exothermic reaction mixtures of the invention may be employed advantageously for facilitating many other phases of metal purification. Exothermic reaction mixtures of the invention may comprise components which will result in the production of slags covering a wide range of compositions, and they may possess a wide range of degrees of exothermicity. The control of composition and the control of exothermicity of the reaction mixtures of the invention permit close control of composition and fluidity of molten slag to obtain the most effective control of purification. Molten slags of suitable compositions and temperatures may be obtained simply by igniting exothermic mixtures of predetermined compositions. The composition of any exothermic mixture may be so adjusted as to produce by exothermic reaction molten slag having a temperature corresponding to that of the metal to be treated or having a temperature higher than or lower than the temperature of the metal to be treated, as desired or required. Ignition of any exothermic mixture may be effected by contacting the molten metal to be treated with the solid reaction mixture or ignition may be effected in any suitable manner out of contact with the molten metal to be treated. The use of the exothermic mixtures of the invention permits elimination of the difficulties of handling molten slags, elimination of large capital expenditures for separate melting furnaces and elimination of chilling of the molten metal encountered in following the procedures of the heretofore customary purification practices.

The ease with which molten slag may be provided in accordance with the invention is conducive also to the production of better and cleaner metal products. Repeated treatments of the metal with similar or different types of slags may be carried out effectively without chilling of the metal taking place. For example, steel product corresponding in quality to that produced from phosphorus-free material in an acid process may be produced readily and effectively from phosphorus-bearing material by first preparing molten steel by the basic process to remove all or a portion of the phosphorus and thereafter treating the steel with an acid slag. Regeneration of contaminated slags such, for example, as oxide contaminated slags produced in deoxidizing steel also is facilitated by the invention. An exothermic reaction mixture of the invention may comprise a quantity of reducing material sufficient to reduce the oxide contaminants below the upper tolerance limit.

An exothermic reaction mixture of the invention preferably consists essentially of solid slag-forming material capable when molten of effecting the removal of one or more impurities from molten metal, solid reducing material and oxidizing material capable of reacting with the reducing material to develop a temperature higher than the melting temperature of the slag-forming material. The components of the reaction mixture preferably are present in such quantities and are so proportioned that the reducing material is capable upon ignition of the reaction mixture of reacting with the oxidizing material to generate sufficient heat to melt the slag-forming material.

Any suitable reducing material may be employed in forming a reaction mixture of the invention. Suitable reducing materials include silicon and aluminum and alloys of silicon and aluminum such, for example, as aluminum silicide, calcium silicide, magnesium silicide and ferrosilicon.

The oxidizing material employed preferably consists of one or more compounds containing oxygen available for reaction with the reducing material but free or substantially free of any metallic element reducible to the elemental state by the reducing material. Sodium nitrate or sodium chlorate or a mixture of sodium nitrate and sodium chlorate may be employed advantageously as the oxidizing material.

A reaction mixture of the invention may, for all practical purposes, be considered as consisting of two component parts, namely, (1) a slag burden, comprising slag or slag-forming materials and (2) a heat generating part consisting of reducing material and oxidizing material. Generally, the slag burden will be inert or non-reactive insofar as the net result of the reaction of the heat generating part of the reaction mixture is concerned, and the reducing material will be present in an amount not substantially in excess of that required for reaction with the oxidizing material to generate sufficient heat to melt the slag burden. When the slag burden comprises oxide-contaminated slag from a previous metal purifying operation, additional reducing material will be included in the reaction mixture in amount sufficient for effective reduction of the contaminants. In order that the slag burden may be melted to provide molten slag of the desired fluidity, the total quantity of reducing and oxidizing materials should be adjusted to develop sufficient heat to melt any products resulting from reaction of the reducing and oxidizing materials in addition to the heat required to melt the slag burden.

Any of the materials commonly employed in forming metal purifying or metal protecting slags may be employed in producing the slag burdens of the reaction mixtures of the invention. Such materials may be employed in chemically combined or uncombined states. When a hygroscopic material such as lime (CaO) forms a part of the slag burden, it preferably is employed in a state in which it is chemically combined with an acid substance such as silica. The slag burden may consist in whole or in part of synthetic slag, or it may consist in whole or in part of an industrial slag product such as an iron blast furnace slag or an oxide-contaminated metal purifying slag. Synthetic slags suitable for use in forming reaction mixtures in accordance with the invention may be produced, for example, by heating slag-forming materials such as lime and silica, lime and ferric oxide or lime, silica and ferric oxide to temperatures sufficiently high to effect chemical combination.

All components of the reaction mixtures preferably are employed in solid finely divided conditions and in intimate admixture. Preferably, the solid particles comprising the reaction mixtures are small enough to pass 100-mesh screens (Tyler series). The reaction mixtures may be employed in powdered form or in the form of agglomerates of any suitable sizes and shapes. When the reaction mixtures are agglomerated, the particles of the slag burden and the particles of reducing material preferably are bonded together by means of the oxidizing material to provide effective contact of reagents. Bonding may be effected by forming, pressing and heating shaped masses to temperatures above or below the melting temperature of the oxidizing material but sufficiently high to eliminate all water and then permitting the shaped masses to cool. Bonding of the particles by means of the oxidizing material is facilitated by wetting the reaction mixtures with an aqueous liquid prior to forming the shaped masses.

The following example illustrates a reaction mixture of the invention which may be employed to produce a slag suitable for use in deoxidizing steel (the proportions are given in parts by weight):

*Example I*

| | Parts |
|---|---|
| Blast furnace slag ($SiO_2$, 45%; $CaO+MgO$, 43%; $Al_2O_3$, 10%) | 18 |
| Sodium nitrate ($NaNO_3$) | 6.6 |
| Ferrosilicon (50% Si) | 3.3 |

The above components may be intimately mixed by grinding together, and the mixture may be employed in powder form or in agglomerated form. Agglomerates may be formed by wetting the mixture with an aqueous liquid, shaping, heating to a temperature above the fusion temperature of sodium nitrate and cooling. This mixture, when added to a ladle prior to tapping or to a mold prior to casting, is ignited upon contact with the molten metal and reacts quickly to form a fluid slag which protects the molten steel from oxidation by the oxygen of the atmosphere and absorbs oxides from the steel.

The following examples illustrate reaction mixtures of the invention which may be employed to produce slags suitable for use in removing phosphorus from molten steel such, for example, as Bessemer steel made from ores high in phosphorus (the proportions are given in parts by weight):

*Example II*

| | Parts |
|---|---|
| Tri-calcium ferrite ($3CaO.Fe_2O_3$) | 18 |
| Sodium nitrate ($NaNO_3$) | 6.6 |
| Ferrosilicon (50% Si) | 3.3 |

*Example III*

| | Parts |
|---|---|
| Tri-calcium ferrite ($3CaO.Fe_2O_3$) | 10 |
| Calcium silicate ($CaO.SiO_2$) | 8 |
| Sodium nitrate ($NaNO_3$) | 6.6 |
| Ferrosilicon (50% Si) | 3.3 |

The components of the above examples may be intimately mixed by grinding together, and the mixtures may be employed in powder form or in agglomerated form. Agglomerates may be formed by wetting the mixtures with an aqueous liquid, shaping, heating to a temperature above the fusion temperature of sodium nitrate and cooling.

Water in an amount equal to about two (2%) percent of the weight of the mixture may be employed satisfactorily in agglomerating each of the above-described mixtures.

Reaction mixtures of the invention may be ignited by contact with the metal to be purified or they may be ignited otherwise to form molten slags prior to commencement of the purifying treatments. The entire amount of reaction mixture to be employed in the treatment of any quantity of metal may be employed or ignited all at one time or in two or more increments.

When a reaction mixture of the invention is ignited by contact of the molten metal to be treated in a receptacle such as a ladle or mold, the first increment of metal poured causes ignition of the mixture with the production of a layer of fluid slag, and the remainder of the molten metal poured into the receptacle passes through the layer of fluid slag thus formed.

I claim:

1. The method of producing a molten slag suitable for use in the purification of metals which comprises forming an exothermic reaction mixture consisting essentially of solid, substantially inert or non-reactive slag-forming material, solid silicon-containing reducing material and solid sodium nitrate, and igniting the reaction mixture.

2. The method of purifying molten metal which comprises contacting the metal with a molten slag formed by igniting an exothermic reaction mixture consisting essentially of solid, substantially inert or non-reactive slag-forming material, solid silicon-containing reducing material and solid sodium nitrate.

3. The method of purifying molten metal which comprises pouring the metal through a layer of molten slag formed by igniting an exothermic reaction mixture comprising solid slag-forming material, solid reducing material and solid oxidizing material capable of reacting with the reducing material to develop a temperature higher than the melting temperature of the slag-forming material.

4. The method of purifying molten metal which comprises pouring the metal through a layer of molten slag formed by igniting an exothermic reaction mixture comprising solid slag-forming material, solid silicon-containing reducing material and solid sodium nitrate.

5. The method of casting molten metal which comprises introducing the metal into a mold containing a layer of molten slag formed by igniting an exothermic reaction mixture comprising solid slag-forming material, solid reducing material and solid oxidizing material capable of reacting with the reducing material to develop a temperature higher than the melting temperature of the slag-forming material.

6. The method of casting molten metal which comprises introducing the metal into a mold containing a layer of molten slag formed by igniting an exothermic reaction mixture comprising solid slag-forming material, solid silicon-containing reducing material and solid sodium nitrate.

7. The method of regenerating contaminated slag produced in the deoxidation of steel which comprises forming an exothermic reaction mixture comprising solid particles of the slag, solid particles of reducing material capable of reducing oxide contaminants of the slag and oxidizing material capable of reacting with the reducing material to develop a temperature higher than the melting temperature of the slag, and igniting the reaction mixture, the components of the reaction mixture being present in such quantities and being so proportioned that the reducing material is capable upon ignition of the reaction mixture of reacting with oxidizing material and the oxide contaminants to reduce the oxide contaminants and generate sufficient heat to melt the slag.

8. An exothermic reaction mixture suitable for use in the purification of molten metal consisting essentially of solid particles of slag-forming material capable when molten of effecting the removal of one or more impurities from molten metal and solid particles of reducing material intimately associated with and bonded together by means of oxidizing material capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material.

9. An exothermic reaction mixture suitable for use in the purification of molten metal consisting essentially of solid particles of slag-forming material capable when molten of effecting the removal of one or more impurities from molten metal and solid particles of reducing material intimately associated with and bonded together by means of oxidizing material capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material and the reducing material being present in the reaction mixture in an amount not substantially greater than that required for reaction with the oxidizing material.

10. An exothermic reaction mixture suitable for use in the purification of molten metal consisting essentially of solid, substantially inert or non-reactive slag-forming material capable when molten of effecting the removal of one or more impurities from molten metal, solid reducing material containing silicon, and solid oxidizing material comprising sodium nitrate and capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material.

11. An exothermic reaction mixture suitable for use in the purification of molten metal consisting essentially of solid, substantially inert or non-reactive slag-forming material capable when molten of effecting the removal of one or more impurities from molten metal, solid reducing material containing silicon, and solid oxidizing material comprising sodium nitrate and capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material and the reducing material being present in the reaction mixture in an amount not substantially greater than that required for reaction with the oxidizing material.

12. An exothermic reaction mixture suitable for use in the purification of molten metal consisting essentially of solid particles of slag-forming material capable when molten of effecting the removal of one or more impurities from molten metal and solid particles of reducing material containing silicon intimately associated with and bonded together by means of oxidizing material comprising sodium nitrate and capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material.

13. An exothermic reaction mixture suitable for use in the purification of molten metal consisting essentially of solid particles of slag-forming material capable when molten of effecting the removal of one or more impurities from molten metal and solid particles of reducing material containing silicon intimately associated with and bonded together by means of oxidizing material comprising sodium nitrate and capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material and the reducing material being present in the reaction mixture in an amount not substantially greater than that required for reaction with the oxidizing material.

14. An exothermic reaction mixture suitable for use in the purification of molten metal comprising solid iron blast furnace slag, solid reducing material, and solid oxidizing material capable of reacting with the reducing material to develop a temperature higher than the melting temperature of the blast furnace slag, the components of the reaction mixture being present in such quantities and being so proportioned that the reducing material is capable upon ignition of the reaction mixture of reacting with the oxidizing material to generate sufficient heat to melt the blast furnace slag.

15. An exothermic reaction mixture suitable for use in the purification of molten metal comprising solid iron blast furnace slag, solid reducing material, and solid oxidizing material capable of reacting with the reducing material to develop a temperature higher than the melting temperature of the blast furnace slag, the components of the reaction mixture being present in such quantities and being so proportioned that the reducing material is capable upon ignition of the reaction mixture of reacting with the oxidizing material to generate sufficient heat to melt the blast furnace slag and the reducing material being present in the reaction mixture in an amount not substantially greater than that required for reaction with the oxidizing material.

16. An exothermic reaction mixture suitable for use in the purification of molten metal comprising solid particles of iron blast furnace slag and solid particles of reducing material intimately associated with and bonded together by means of oxidizing material capable of reacting with the reducing material to develop a temperature higher than the melting temperature of the blast furnace slag, the components of the reaction mixture being present in such quantities and being so proportioned that the reducing material is capable upon ignition of the reaction mixture of reacting with the oxidizing material to generate sufficient heat to melt the blast furnace slag.

17. The method of casting molten metal which comprises introducing the molten metal into a mold and into contact therein with an exothermic reaction mixture consisting essentially of solid, substantially inert or non-reactive slag-forming material capable when molten of effecting the removal of one or more impurities from molten metal, solid reducing material, and solid oxidizing material capable of reacting with the reducing material to develop a temperature higher than the melting temperature of the slag-forming material, the components of the reaction mixture being present in such quantities and being so proportioned that the reducing material is capable upon ignition of the reaction mixture of reacting with the oxidizing material to generate sufficient heat to melt the slag-forming material.

MARVIN J. UDY.